(12) United States Patent
Saboe

(10) Patent No.: US 7,819,960 B2
(45) Date of Patent: Oct. 26, 2010

(54) HIGH VOLUME, LOW BACK-PRESSURE GAS SCRUBBER

(76) Inventor: Dennis Saboe, Box 401, Wembley, Alberta (CA) T0H 3S0

( * ) Notice: Subject to any disclaimer, the term of this patent is extended or adjusted under 35 U.S.C. 154(b) by 0 days.

(21) Appl. No.: 12/045,014

(22) Filed: Mar. 9, 2008

(65) Prior Publication Data

US 2008/0219905 A1    Sep. 11, 2008

Related U.S. Application Data

(60) Provisional application No. 60/893,881, filed on Mar. 8, 2007.

(51) Int. Cl.
*B01D 53/14*      (2006.01)
*B01D 53/52*      (2006.01)

(52) U.S. Cl. .............. 96/290; 96/296; 96/298; 96/300; 96/364; 96/371; 422/177; 261/95

(58) Field of Classification Search .......... 96/290, 96/296–298, 300, 355, 361, 363, 364, 371; 95/210–211; 422/177, 179, 190, 211; 261/94, 261/95, DIG. 72
See application file for complete search history.

(56) References Cited

U.S. PATENT DOCUMENTS

| | | | | |
|---|---|---|---|---|
| 3,122,594 A | * | 2/1964 | Kielback | 261/94 |
| 3,302,372 A | * | 2/1967 | Hynson et al. | 95/211 |
| 3,432,994 A | * | 3/1969 | Whiton et al. | 95/211 |
| 3,793,809 A | * | 2/1974 | Tomany et al. | 95/211 |
| 3,856,487 A | * | 12/1974 | Perez | 96/240 |
| 3,874,858 A | * | 4/1975 | Klugman et al. | 96/47 |
| 4,105,722 A | * | 8/1978 | Sorenson | 261/94 |
| 4,110,088 A | * | 8/1978 | Cold et al. | 95/211 |
| 4,533,367 A | * | 8/1985 | Hadzismajlovic | 95/211 |
| 5,302,361 A | * | 4/1994 | Nagl | 423/220 |
| 5,332,477 A | * | 7/1994 | Iyer et al. | 203/20 |
| 5,693,224 A | * | 12/1997 | Fox | 210/202 |
| 5,756,047 A | * | 5/1998 | West et al. | 422/37 |
| 6,174,498 B1 | * | 1/2001 | Jain et al. | 422/122 |

\* cited by examiner

*Primary Examiner*—Frank M Lawrence
(74) *Attorney, Agent, or Firm*—Sander R. Gelsing

(57) ABSTRACT

In one aspect of the invention there is provided a gas scrubbing system for removing contaminants from a flow of fluid, comprising a container having an interior volume, an inlet for receiving the flow of fluid and an outlet for dispensing the stream of fluid, a treatment liquid, a porous medium positioned in the interior volume, between the inlet and outlet, said porous medium providing a high surface area to facilitate chemical interactions between the fluid flow and the treatment liquid and means to apply the treatment liquid onto the porous medium. A contact cell aspect of the porous medium and a method aspect are also provided.

9 Claims, 10 Drawing Sheets

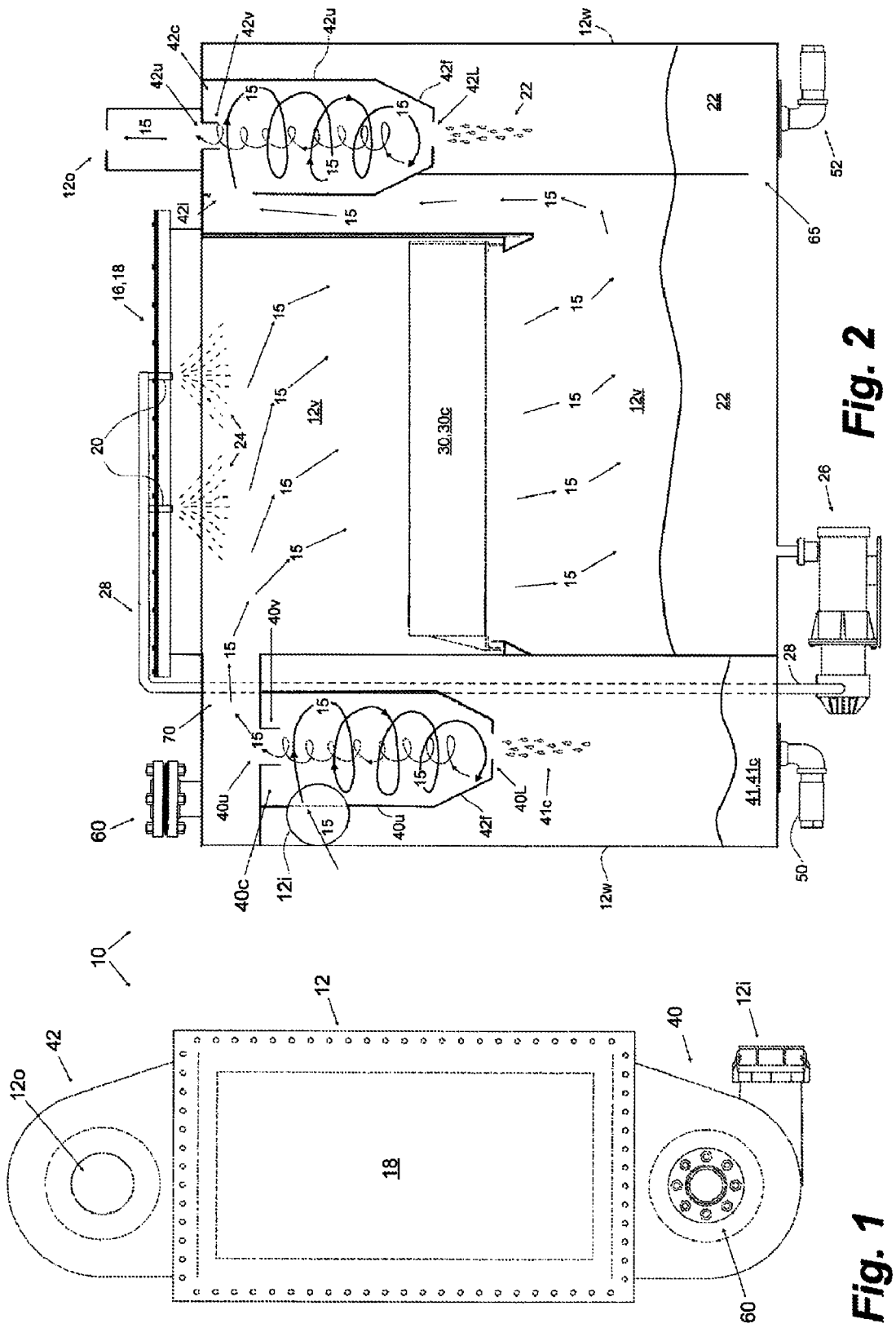

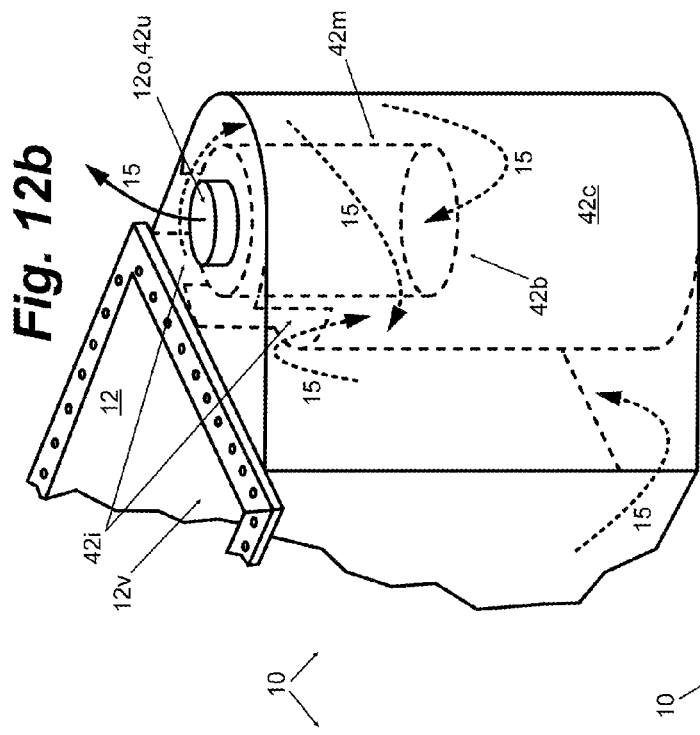
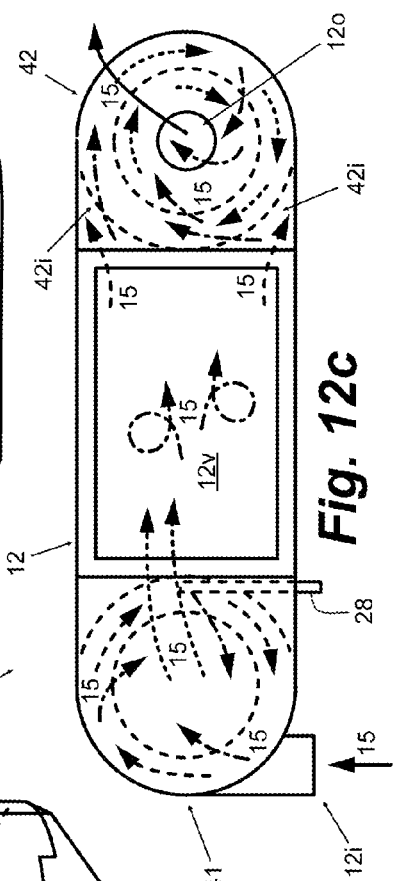
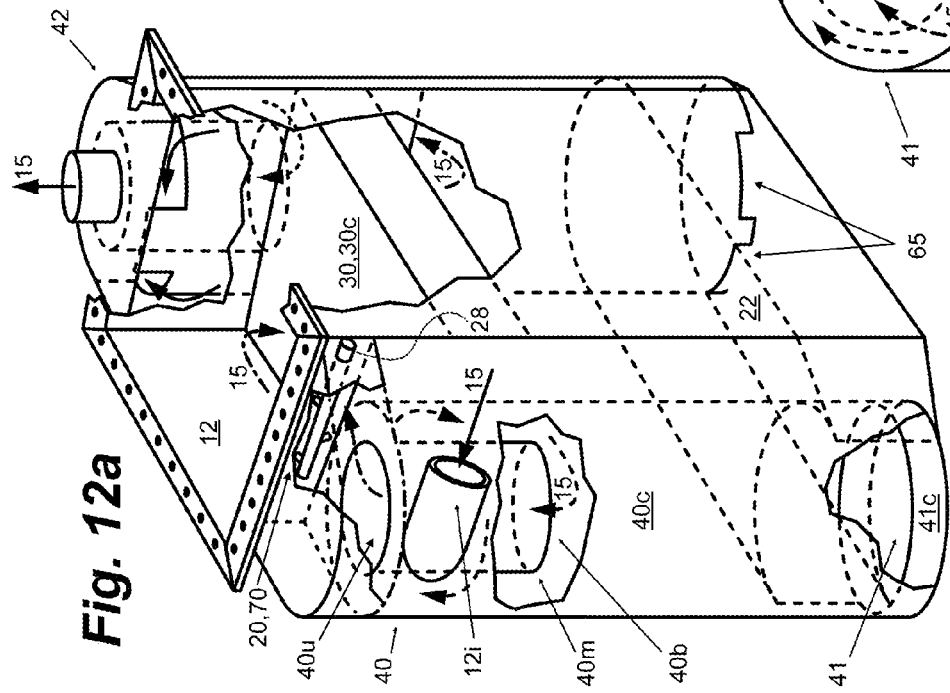

HIGH VOLUME, LOW BACK-PRESSURE GAS SCRUBBER

CROSS REFERENCE TO RELATED APPLICATION

This application is a regular application of U.S. Provisional Patent Application Ser. No. 60/893,881 filed Mar. 8, 2007 and entitled "HIGH VOLUME, LOW BACK-PRESSURE GAS SCRUBBER", the entirety of which is incorporated herein by reference.

FIELD OF THE INVENTION

The field of present invention relates generally to gas scrubbing equipment and, more particularly, to equipment suitable for scrubbing impurities from high volume gas streams without creating a significant rise or increase in back pressure.

BACKGROUND OF THE INVENTION

Gas scrubbers are used in many industrial processes and applications to clean, remove or "scrub" certain undesirable gaseous components from gas streams in general. One area in which a large number of developments have been made is in the scrubbing of gases produced during, or related to, oil and gas recovery and storage operations. Examples of operations where a gas scrubber is typically used include loading and transportation of sour liquids, venting storage tanks during completion operations and well testing, purging of vessels and pipelines, bleeding off wellheads, venting settling tanks for underbalanced drilling, controlling emissions and odors from industrial processing, controlling vacuum truck emissions and odor control during plant turn-around and tank cleaning operations.

During such operations, poisonous hydrogen sulfide ($H_2S$) present presents a health hazard to workmen in the area. To protect the workmen and the public-at-large, the permissible conditions and levels for emissions of hydrogen sulfide are regulated by various regulatory agencies.

Conventional systems for the absorption or removal of unwanted contaminants from a gas source or stream often employ a liquid solvent or scavenger to "scavenge" out the $H_2S$. An example of such a treatment liquid is the hydrogen sulfide scavengers HSW705 and HSW700 manufactured by Baker Petrolite of Sugar Land, Tex., U.S.A. Information supplied by Baker Petrolite notes that the HSW705 formulation is specifically designed to remove hydrogen sulfide from produced gas and that this liquid product combines with hydrogen sulfide ($H_2S$) to form stable, water-soluble reaction products that may be easily removed from the system. Baker Petrolite recommends that the point of injection of the scavenging chemical be as early as conveniently possible in the producing system to maximize contact time, i.e. injection downhole or before wellhead chokes are generally the best points of application. However, this may be impractical in some of the operations noted above, such as during the loading and transportation of sour liquids, venting storage tanks during completion operations and well testing, purging of vessels and pipelines, venting settling tanks for underbalanced drilling, controlling emissions and odors from industrial processing, controlling vacuum truck emissions and odor control during plant turn-around and tank cleaning operations.

Likewise, Am-Gas Scrubbing Systems (1989) Ltd. of Didsbury, Alberta, Canada distributes and markets chemical products under the trademark PARATENE, which are used as hydrogen sulfide scavengers for use in oilfield and industrial applications and, depending on the exact formulation, forms either water-soluble or oil-soluable by-products. Examples include PARATENE M310, PARATENE M311, PARATENE M315, PARATENE M316, PARATENE M320 and PARATENE M330.

The prior art is replete with various examples of devices and methods for the "scrubbing" of gas streams using such treatment liquids or liquid scavengers. However, none of the prior art devices provide a relatively portable device which is capable of efficiently removing gases like hydrogen sulfide quickly from large volumes of influent gas and without creating a significant amount of back-pressure. Furthermore, prior art devices have problems with liquid scavenger chemical exiting out of the devices when back-pressures are low, problems with dealing with the high gas volumes and flow rates when they are hooked up to a vacuum truck and problems with providing sufficient contact time to allow the liquid scavenger to treat the gas and remove or "scrub" the hydrogen sulfide. The present invention addresses these problems.

SUMMARY OF THE INVENTION

In one aspect of the invention there is provided a gas scrubbing system for removing contaminants from a flow of fluid, comprising: a container having an interior volume, an inlet for receiving the flow of fluid and an outlet for dispensing the stream of fluid, a treatment liquid, a contact cell positioned in the interior volume, between the inlet and outlet, for providing a high surface area to facilitate chemical interactions between the fluid flow and the treatment liquid and means to apply the treatment liquid onto the contact cell.

In another aspect of the invention there is provided a contact cell for use in a gas scrubbing system, comprising a layer of poly-propylene beads.

In a method aspect, a method to purify a stream of gas is provided. The method comprises the steps of providing a treatment liquid, treating the stream of gas with a first separator to remove any liquid and solid contaminants, scrubbing the stream of gas with a liquid scavenger and treating the scrubbed stream of gas with a second separator to remove any remaining liquid scavenger.

BRIEF DESCRIPTION OF THE DRAWINGS

FIG. 1 is a top view of one embodiment of the gas scrubber according to the present invention;

FIG. 2 is a diagrammatic front sectional view of the gas scrubber of the embodiment of FIG. 1;

FIGS. 12a-12c are cut-out perspective and top views of another embodiment of the gas scrubber.

DETAILED DESCRIPTION OF THE PREFERRED EMBODIMENTS

Figure 3A:
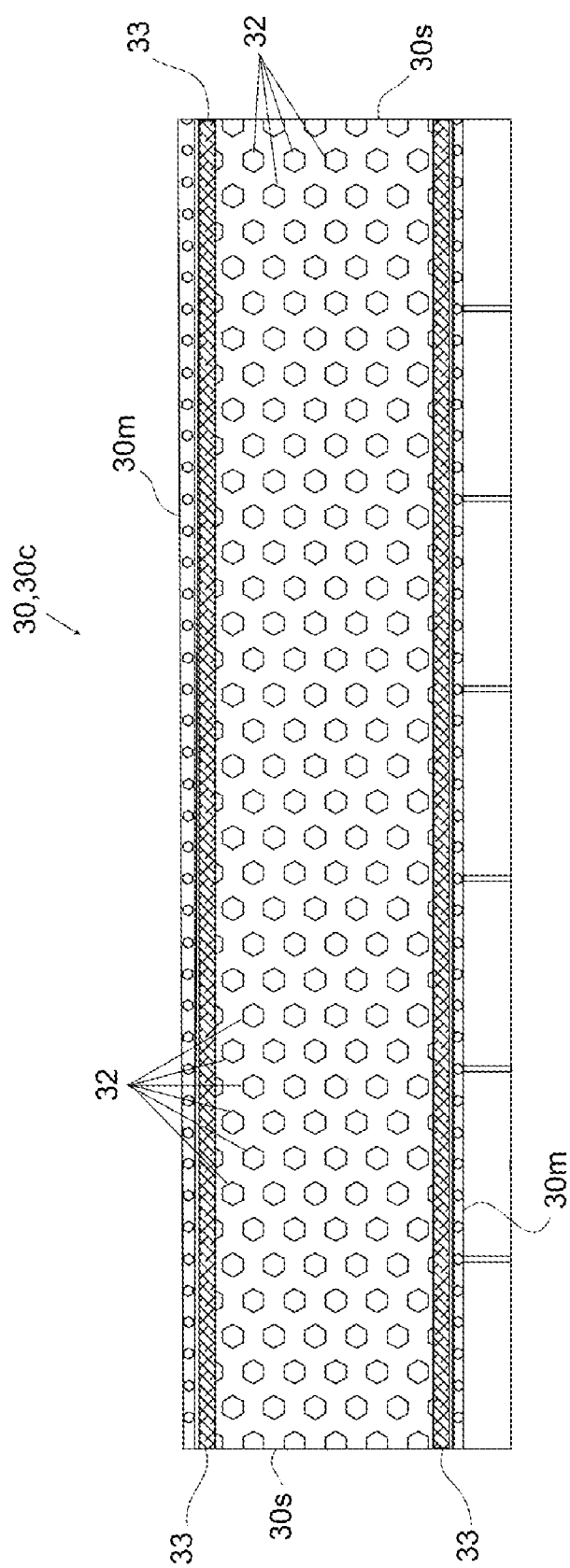
FIG. 3a is a diagrammatic side sectional view of a preferred embodiment of a contact cell.
Figure 3B:
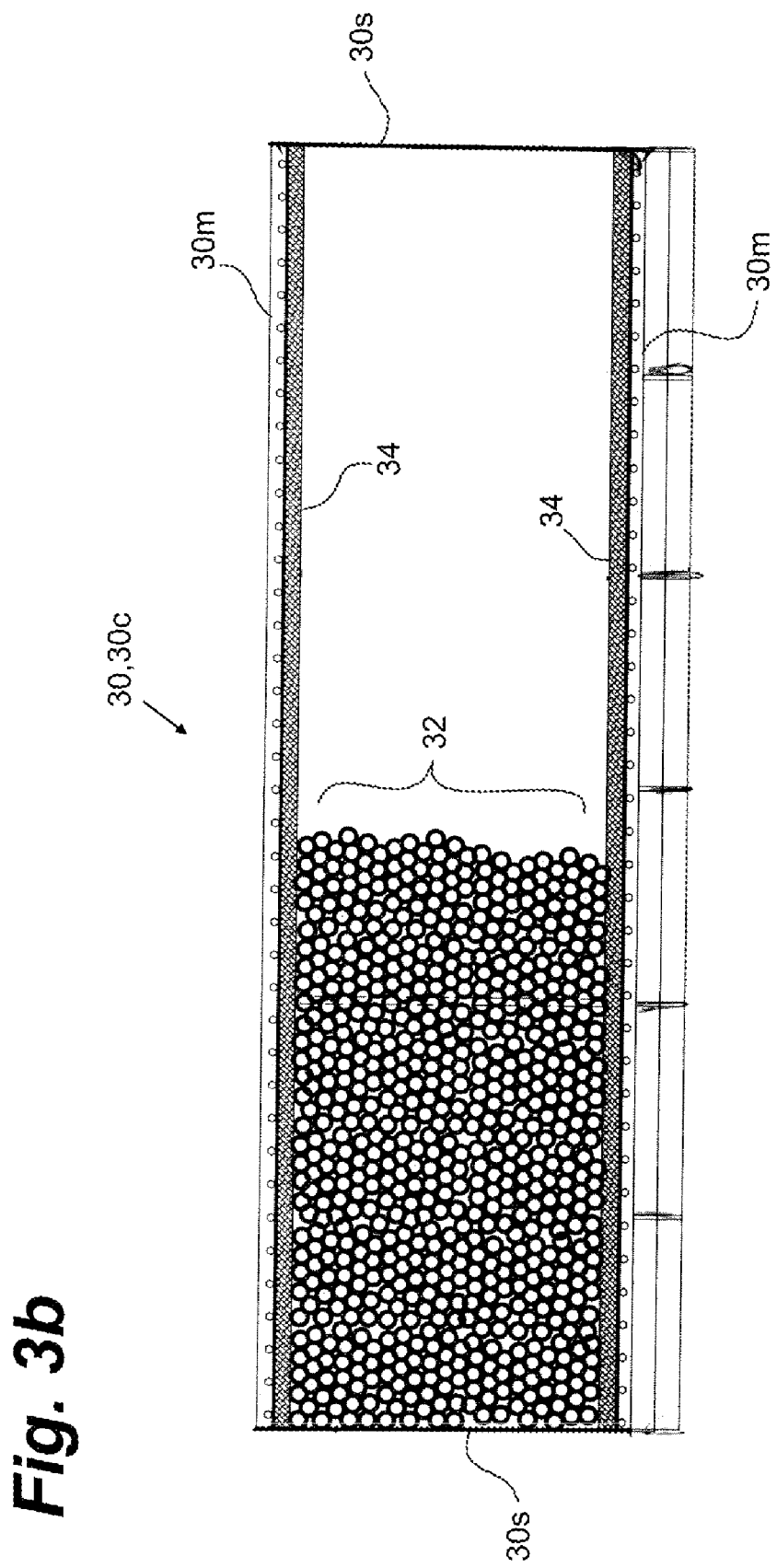
FIG. 3b is a diagrammatic side sectional view of a second embodiment of a contact cell.
Figure 4:
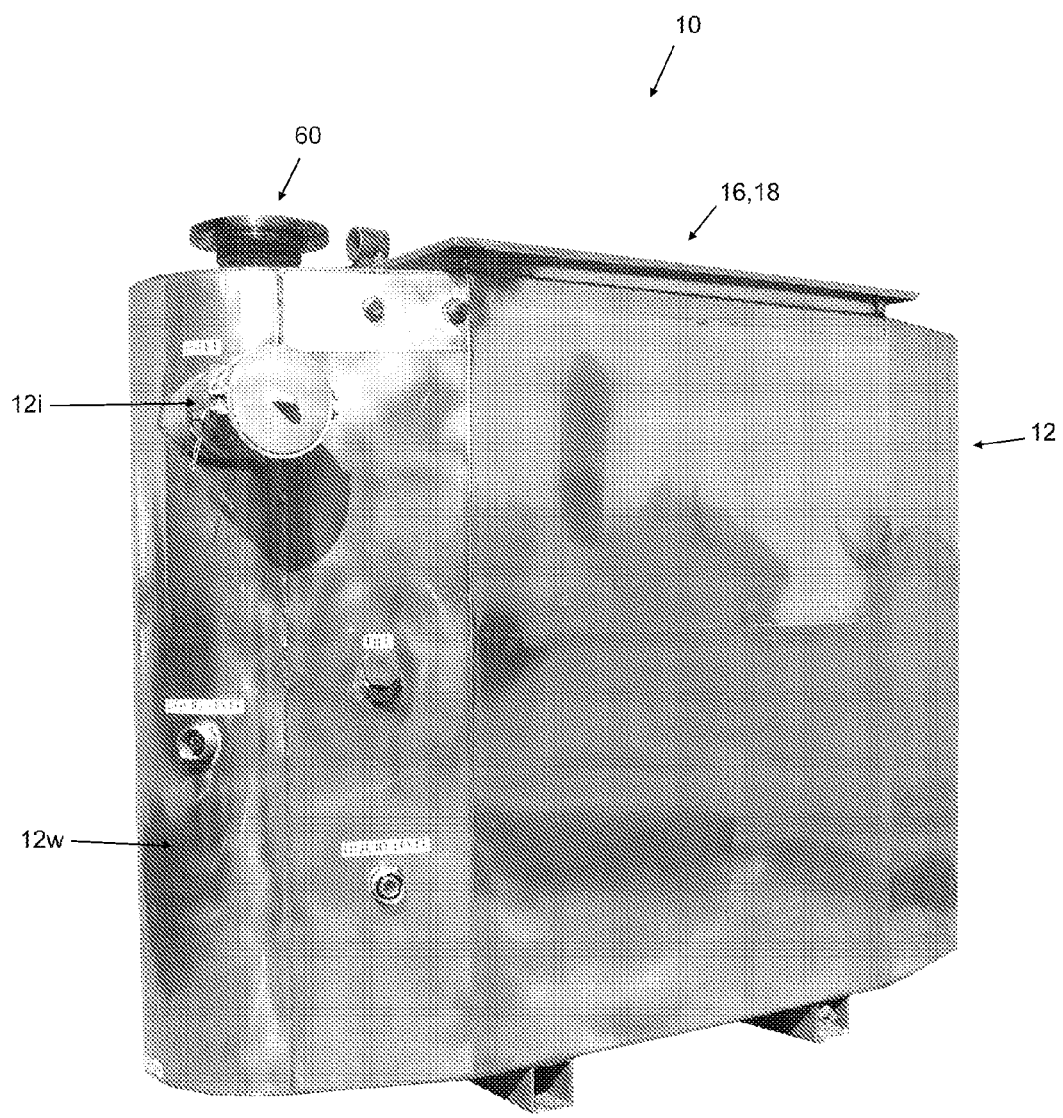
FIGS. 4-5 are front perspective views of the gas scrubber of the embodiment of FIG. 1.
Figure 5:
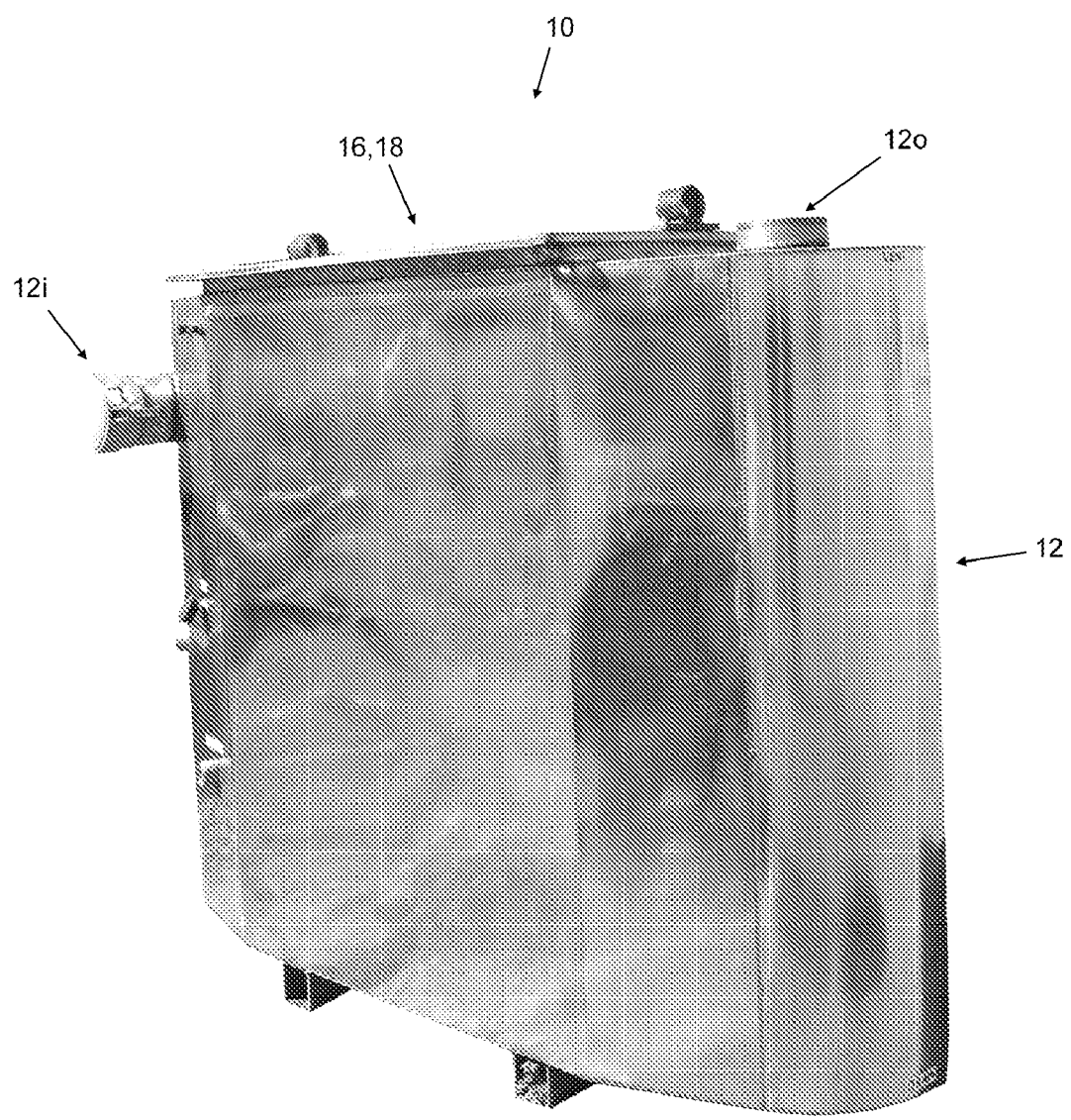
Figure 6:
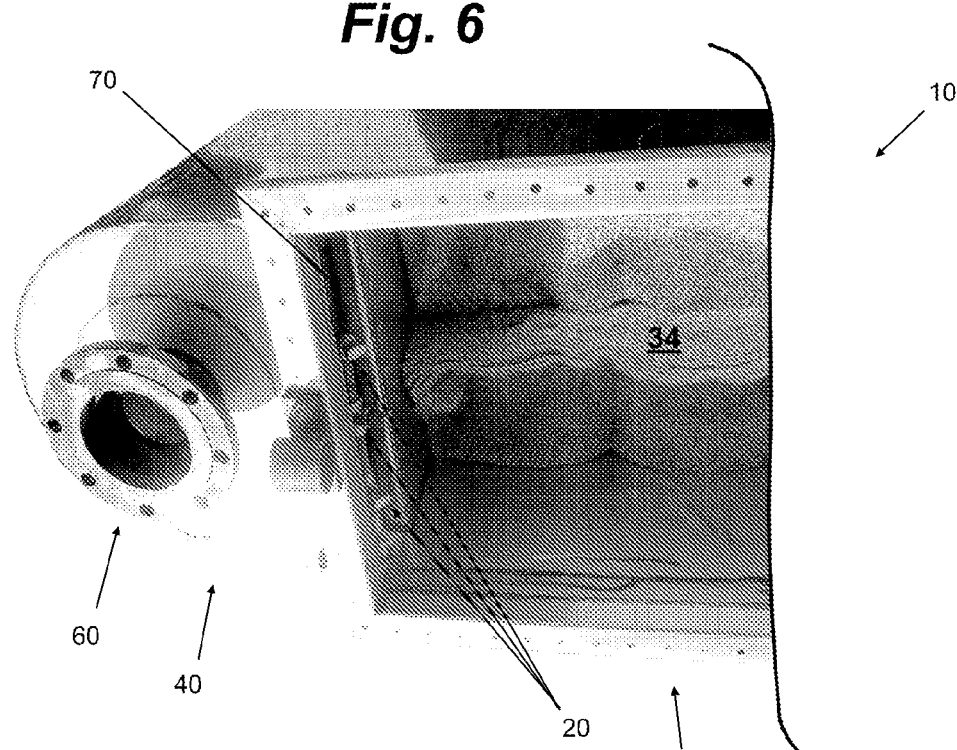
FIGS. 6-9 are top perspective view the gas scrubber of the embodiment of FIG. 1, looking down into the interior volume of the scrubber.
Figure 7:
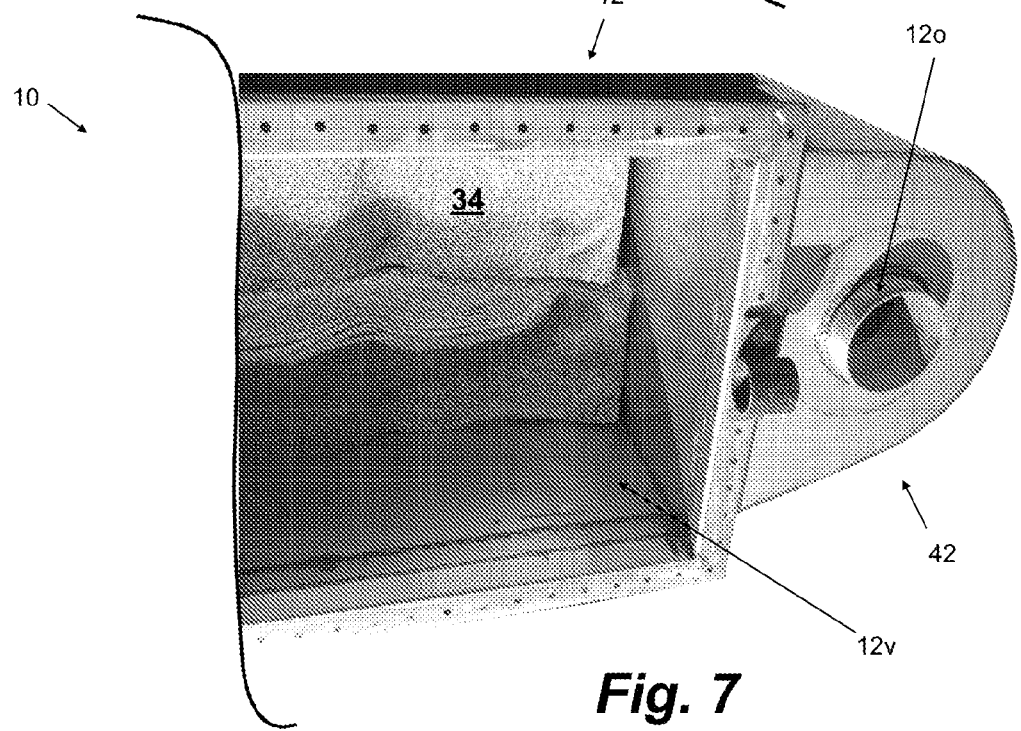

The following description are of preferred embodiments by way of example only and without limitation to the combination of features necessary for carrying the invention into effect. Reference is to be had to the Figures in which identical reference numbers identify similar components. The drawing figures are not necessarily to scale and certain features are shown in somewhat schematic form in the interest of clarity and conciseness.

Figure 10:
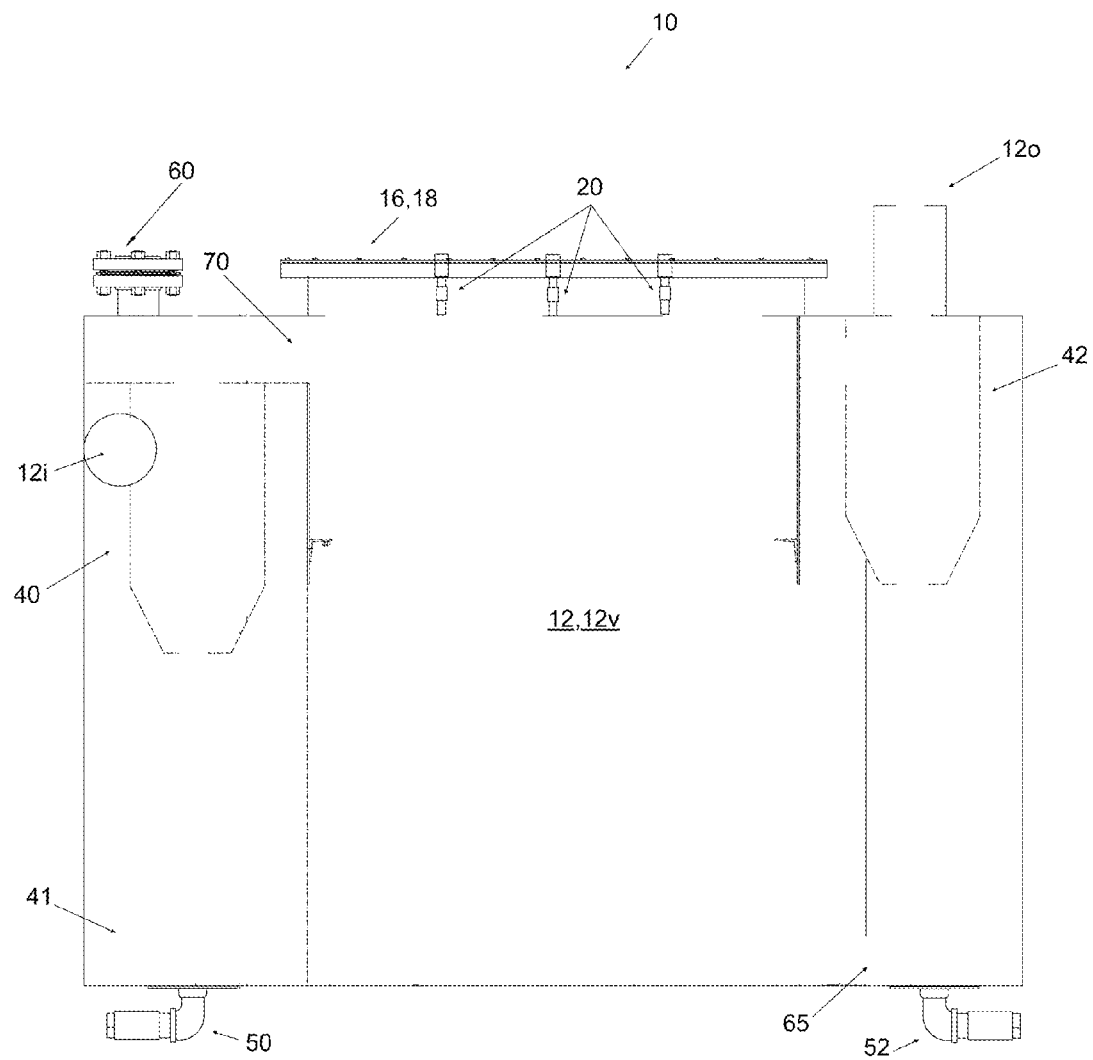
FIG. 10 is a front view of a second embodiment of the gas scrubber.
Figure 11:
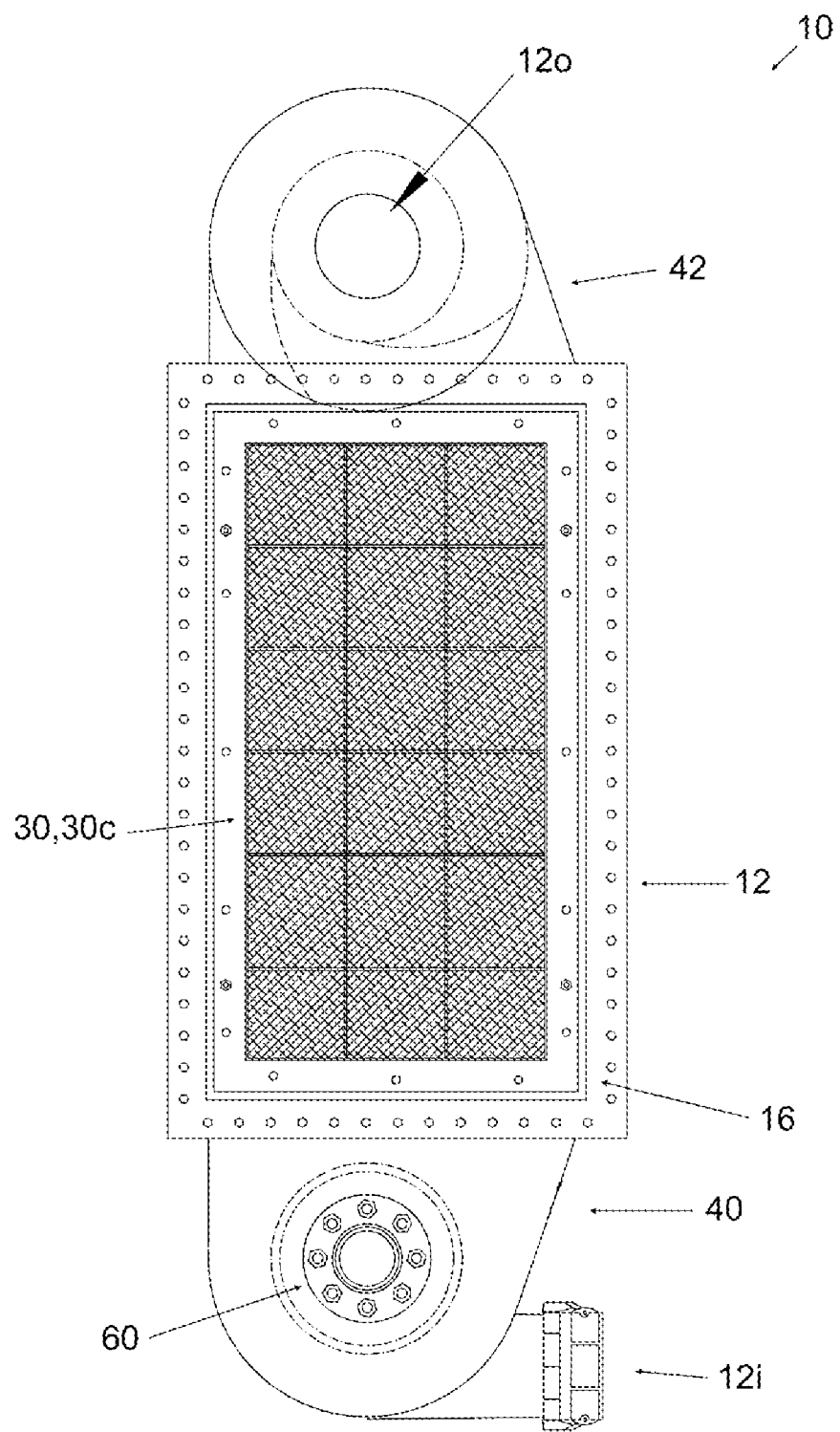
FIG. 11 is a top view of the gas scrubber of the embodiment of FIG. 10.

Referring to the Figures generally, one embodiment of a gas scrubbing system constructed in accordance with the present invention 10 is illustrated in FIGS. 1-9, a second embodiment of a gas scrubbing system constructed in accordance with the present invention is illustrated in FIGS. 10-11 and a third embodiment of a gas scrubbing system constructed in accordance with the present invention is illustrated in FIGS. 12a-12c. The three embodiments are similar to each other, differing only in minor aspects as shown in the figures and as further described below. Operation of the three embodiments is also similar, again with the difference between them as shown in the figures and as further described below.

Referring to the Figures generally, the scrubber system 10 comprises a main vessel or container 12. The vessel 12 has an interior volume 12v, an inlet 12i for receiving a predetermined mass flow rate of gas, that may be contaminated by a pollutant such as hydrogen sulfide, and an outlet 12o for dispensing the gas once it has been treated with a treatment liquid, scrubber solution or scavenger 22, 24. The flow of the gas is from the inlet 12i to the outlet 12o and is shown generally by the arrows designated as 15. Preferably the treatment liquid 22, 24 is one of the hydrogen sulfide scavengers distributed by Am-Gas Scrubbing Systems (1989) Ltd. of Didsbury, Alberta, Canada under the PARATENE trademark.

A preferred material for the vessel 12 is steel. In this embodiment, the vessel 12 is conveniently in the form of a hollow box having a closed bottom 12b and vertical side walls 12w and measuring approximately 44 inches long by 29 inches wide and 67 inches high. Preferably the system 10 further comprises an open top 16 and a detachable or removable lid 18. Alternatively, the system 10 may take any other suitable form, such as that of a drum, without departing from the spirit or scope of this invention. Preferably the vessel 12 is a pressure vessel capable of tolerating gas pressures of 1.5 pounds per square inch (psi) or higher.

Figure 8:
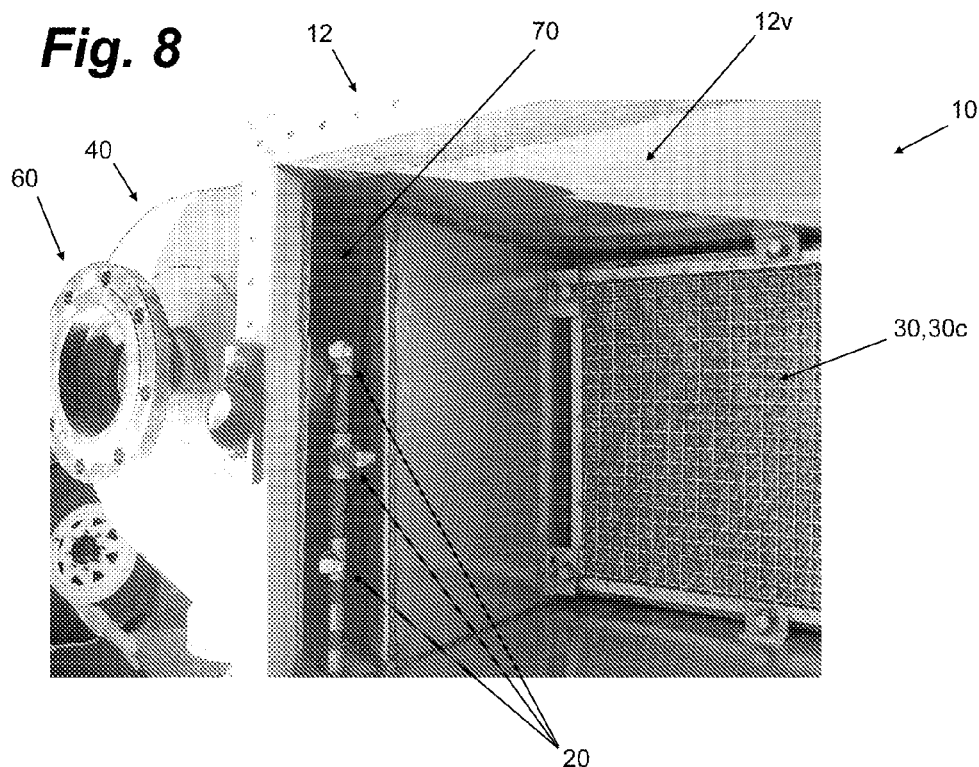
Figure 9:
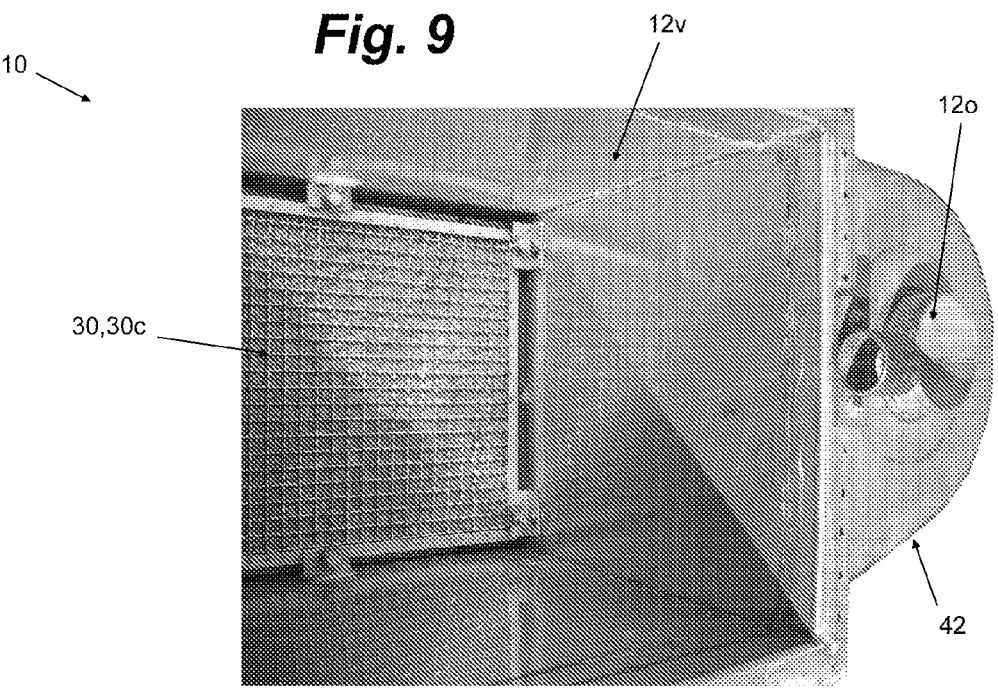

The system 10 further comprises at least one suitable conventional spray nozzle 20 to convert a source of liquid scavenger 22 into a spray of droplets 24. The spray nozzle 20 is provided or mounted to the vessel 12 so as to inject or introduce the liquid scavenger 24 into the upper portion of the vessel's interior volume 12v. Preferably a plurality of nozzles 20 are provided at various positions inside the vessel's interior 12v. The embodiment of FIGS. 1-9 has two nozzles 20 depending from the lid 18 (see FIG. 2) and three nozzles 20 positioned as shown in FIG. 8. The embodiment of FIGS. 10-11 has three nozzles depending from the lid. The embodiment of FIGS. 12a-12c, like that of the first embodiment, has as two nozzles 20 depending from the lid (not shown) and three nozzles 20 positioned as shown in FIG. 12a.

More preferably, pumping means, in this embodiment comprising a pump 26 along with associated hosing and tubing 28, are provided to link the source of liquid scavenger 22 to the nozzles 20 in a conventional manner. Even more preferably, the pump is capable of pumping at least 10 gallons per minute so as to ensure that the porous medium 30 remains substantially wetted with liquid scavenger 22 during operations.

Yet even more preferably, the lower portion of the vessel's interior volume 12v functions as a retaining reservoir for the source of liquid scavenger 22. Advantageously, the liquid scavenger 24 released from the nozzle 20, or nozzles 20, in the upper portion of the vessel's interior volume 12v descends to the lower portion and once again become part of the source 22.

The system 10 further comprises a high surface area, porous substrate or medium 30 which is placed inside the vessel 12 and in the path of the flow of the gas 15 as it moves from the inlet 12i to the outlet 12o. The porous medium 30 minimizes disruption of the normal flow pattern of the flow of gas 15 through the system 10 while at the same time providing a high surface area to carry treatment liquid 22, 24 that coats the medium, thereby allowing the system 10 to treat high volume gas streams without creating a significant rise or increase in back pressure.

In this embodiment, the porous medium 30 is in the form of a 6-inch deep bed of approximately $1/8^{th}$ inch diameter poly-propylene beads 32, measuring approximately 44 inches by 22 inches for a total volume of approximately 5808 cubic inches of 1/8th inch poly-propylene beads. Such poly-propylene beads 32 are distributed by Ashland Canada Corp of Richmond, B.C., Canada. The porous medium 30 is located within the interior volume 12v so as to be substantially "wetted" or coated by the droplets of scavenger 24 exiting the nozzles 20 while at the same time be in the path of all, or substantially all, of the flow of the gas 15 as it moves from the inlet 12i to the outlet 12o. Advantageously, this substantially "wetted" high surface area medium 30 provide for numerous interaction sites for treatment liquid 22 to interact with the gas flow 15. More advantageously, the continual circulation of treatment liquid 22 (by the pump 26) from the source, through the nozzle 20, or nozzles 20, across the porous medium 30 and back to the source results in an efficient use of said treatment liquid 22.

The inventor has observed that using a porous medium 30 with a thickness range of about 6 inches to 30 inches of beads 32 resulted in good scrubbing or treating performance by the system 10, allowing the system 10 to treat high volumes and flow rate gas streams 15 without creating a significant rise or increase in back pressure.

Preferably, the porous medium 30 is in the form of a contact cell 30c and of such dimensions so as to be in the path of most or all of the flow of gas 15. More preferably the dimensions of the contact cell's periphery are such that a very close tolerance fit is obtained when the contact cell 30c is placed inside the vessel, thereby providing little room or space for gas to flow around the cell 30c.

More preferably the contact cell 30c further comprises two ½ inch thicknesses of 1/8 inch thick reticulated open-cell foam layers 33 placed directly below and an top of the porous medium (see FIG. 3a). Such reticulated open-cell foam layers 33 is distributed by Norwesco Industries (1983) Ltd. of Calgary, Alberta, Canada. Even more preferably, the contact cell 30c is removable by surrounding or encasing the 6-inch bed of beads 32, and the open-cell foam 33, with a 1/16th inch screen material 30m at the top and bottom and enclosing the sides 30s with $1/8^{th}$ inch steel (see FIG. 3a). Advantageously, the thicknesses of open-cell foam 33 provides additional stability and cushioning to the contact cell 30c as a whole and keeps the beads 32 well packed. More advantageously, the relatively thin layers of foam 33 (only ½ inch total thickness at both top and bottom) acts as a filter material, preventing dirt and debris from lodging in the beads 32, while allowing the flow of gas 15 through without significantly increasing the back pressures.

Even more preferably, sealing means (not shown) are used to seal the periphery of the contact cell 30c against the interior walls of the vessel 12, thereby ensuring that all of the flow of gas is directed through the contact cell 30c. The inventor initially utilized a Ethylene Propylene Diene Monomer (EPDM) seal for this purpose. This worked well initially. However, after some time this seal underwent some shrinkage and needed to be replaced. It is speculated that this shrinkage was due to heat. Subsequent experimentation with a buna seal showed that this type of seal did not undergo this kind of shrinkage and therefore lasts longer. It is to be understood that a seal or sealing means is not critical to the invention.

Advantageously, the contact cell 30c provides for easy containment of the beads 32, thereby allowing them to be easily removed, cleaned, replaced and/or serviced when dirty. More advantageously, the contact cell 30c prevents shifting of the beads 32 during operations on unleveled ground or during transportation of the system 10.

The inventor estimates that providing the above-noted 6-inch deep bed of approximately $\frac{1}{8}^{th}$ inch diameter poly-propylene beads 32, measuring approximately 44 inches by 22 inches and having a cross sectional area of 968 square inches and total volume of 5808 cubic inches, results in a surface area of approximately 81,312 square inches plus-or-minus 25%. The inventor observed that using the above-noted contact cell 30c configuration, with the layers of open-cell foam 33, and said cell 30c being substantially wetted with treatment liquid 22, 24 during gas scrubbing operations, resulted in back pressure of only approximately 18" water column with a flow rate of approximately 800 standard cubic feet per minute across said bed.

Another embodiment of a contact cell 30c (see FIG. 3b) comprises two ½ inch thicknesses of mist eliminators or demister pads 34 instead of reticulated open-cell foam 33, but is otherwise similar to the embodiment of FIG. 3a. Such demister pads 34 are distributed by Industrial Process Products Ltd. of Calgary, Alberta, Canada. Advantageously, the use of demister pads 34 provides for even less back pressures during operations than a similar thickness of reticulated open-cell foam. The inventor observed that using a substantially wetted (with treatment liquid 22) contact cell 30c configuration of 10½-inch deep bed of approximately $\frac{1}{8}^{th}$ inch diameter poly-propylene beads 32, measuring approximately 44 inches by 22 inches and having a cross sectional area of 968 square inches, but with the two layers of ½ inch thick demister pad 34 (instead of the layers of open-cell foam 33), during gas scrubbing operations resulted in very similar back pressures, again of only approximately 18" water column with a flow rate of approximately 800 standard cubic feet per minute across said bed. However, by using a 10½-inch deep bed of beads 32, the total surface area provided increased significantly (estimated by the inventor to be approximately 142,296 square inches, plus-or-minus 25%).

During operations, the inventor observed that, when using this second embodiment of contact cell 30c (i.e. having demister pad material instead of open-cell foam) in the system 10 of the embodiment shown in FIGS. 12a-12c, the system 10, using approximately 410 liters of PARATENE M320 treatment liquid 24, was able to completely scrub a 1½ percent sour ($H_2S$) flow of gas 15 (i.e. resulting in 0 ppm $H_2S$ concentration at the outlet) having a flow rate of 800 cubic feet per minute and only created a back pressure of approximately 18" water column.

As will be appreciated by those skilled in the art, a number of factors will determine how long a particular batch of treatment liquid 24 will last before said batch 24 becomes spent and the system 10, during operation, will start showing signs of $H_2S$ breakthrough at the outlet 12o, such as $H_2S$ concentrations in the range of 5-25 ppm at the outlet. One factor is the particular treatment liquid used. Another factor is the amount of treatment liquid used (for example, one would expect a 200 liter batch of treatment liquid to last roughly half as long as a 400 liter batch, assuming all other factors are equal). A third factor is the $H_2S$ concentration in the flow of gas 15. A forth factor is the volumetric flow rate of gas 15 through the system.

Observations:

When using 410 liters of PARATENE M320 treatment liquid 24 in the system 10 of the embodiment shown in FIGS. 12a-12c with the second embodiment of the contact cell 30c (FIG. 3b) and a gas flow 15 rate of 1400 standard cubic feet per minute (SCFM), the inventor has observed the following:

(i) light duty operation, of scrubbing a gas flow with 2,000 ppm $H_2S$ concentration at the inlet 12i, resulted in the system 10 being able to operate for 50 hours or more before any signs of $H_2S$ breakthrough at the outlet 12o; and (ii) heavy duty operation, of venting two storage tanks at approximately 80,000 ppm $H_2S$ concentration at the inlet 12i, resulted in the system 10 initially having a 20 ppm $H_2S$ concentration at the outlet 12o, with this having increased to 80 ppm $H_2S$ concentration after one hour of operations.

When the treatment liquid 24 starts showing signs of breakthrough, i.e. it becoming less effective at combining with hydrogen sulfide ($H_2S$) to form stable end products and resulting in an unacceptable concentration of $H_2S$ at the outlet (such as an $H_2S$ concentration greater than 10 ppm), the liquid scavenger 24 can be drained from the system 10 and replaced with a fresh batch of such treatment liquid 24.

Using a contact cell 30c composed only of demister pad material 34 (see FIGS. 6-7) proved to be cost prohibitive in that a given thickness of demister pad is much more expensive that a given thickness of poly-propylene beads 32 and the surface/contact area provided by demister pads is significantly inferior to the amount of surface area provided by a similar thickness of poly-propylene beads 32.

Similarly, the inventor has observed that using glass particles, instead of poly-propylene beads also had disadvantages. Although glass particles provide a similar amount of surface area per unit volume, as compared to the poly-propylene bead, one of the disadvantage of such glass particles is that over time they could break into even smaller pieces which may escape from the contact cell and can get caught in the pump 26, potentially damaging the pump's internal mechanisms.

Preferably, the scrubber system 10 further comprises an inlet separator 40 and catch reservoir 41 associated with the vessel's inlet 12i and an outlet separator 42 associated with the vessel's outlet 12o. More preferably, the inlet and outlet separators 40, 42 are cyclone separators (see FIG. 2). Cyclone separators as such are well-known in the art and rely on generated centrifugal and shear forces to achieve separation into two streams of different densities.

Briefly and as shown in FIG. 2, the cyclone separators 40, 42 comprises a chamber 40c, 42c having a vertical axis with an upper cylindrical portion 40u, 42u and a lower, inverted frustro-conical portion 40f, 42f. The mixture is introduced through a tangential inlet 12i, 42i to the cyclone separator, which causes heavier particles to be flung, under centrifugal force, against the outer wall of the chamber and flow downwardly along, as underflow, and around the wall to a lower axial outlet 401, 421, while the lighter, remaining, proportion of the mixture is drawn off by an axial pipe, known as a vortex finder 40v, 42v, from a point within the body of the cyclone separator 40, 42 as overflow and conveyed overhead through upper axial outlet 40u, 42u. One form of cyclone separator is disclosed in U.S. Pat. No. 4,737,271, but other forms of cyclone separators are known in the art and may also be used. The cyclone separators are preferably used, for the reason that a cyclone separator is a simple, reliable and relatively inexpensive piece of equipment that is highly effective in separating lower and higher density materials.

Other forms of inlet and outlet separators 40, 42 may be utilized. For example, FIGS. 12a-12c illustrate another embodiment of the system 10 wherein the separators 40, 42 comprise a generally cylindrical chamber 40c, 42c having a vertical axis, an upper axial outlet 40u, 42u and an internal cylindrical member 40m, 42m positioned around the upper axial outlet 40u, 42 and depending partway downward into the separator 40, 42. The cylindrical member 40m has a bottom axial opening 40b, 42b. The mixture is introduced into the separator 40, 42 through one or more a tangential inlets 12i, 42i, which, under gravitational and centrifugal forces, causes heavier particles to be flung against the outer wall of the separator and flow downwardly to the bottom of the separator 40, 42, while the lighter, remaining, gaseous mixture is forced around the cylindrical member 40m in a generally downward rotary motion until conveyed into the cylindrical member 40m (through its bottom axial opening 40b, 42b) and finally out through upper axial outlet 40u, 42u.

Advantageously, the inlet separator 40 facilitates the removal of contaminants 41c such as oil, water and dirt from the inlet flow of fluid prior to entering the interior volume 12v (through passage 70) and directing said contaminants 41c into the catch reservoir 41, thereby preventing such contaminants 41c from plugging or contaminating the contact cell 30c. More advantageously, the outlet separator 42 facilitates separation of any liquid scavenger 24 from the gaseous flow 15 (coming via inlets 42i), that did not fall back into the source 22, prior to the gaseous flow exiting of the vessel 12 through the outlet 12o. Even more advantageously, the axial outlet 421 directs any separated out scavenger 24 back to the main source 22, preferably via openings 65. Alternatively, other forms of separators may be utilized.

As noted above, the contact cell 30c provides a high surface area for the liquid scavenger 22, 24 to cling to, and/or coat, while still allowing for the gas flow 15 to move therethrough without producing a great deal of back pressure. The contact cell 30c, along with the liquid scavenger 22, 24, thereby creates a gas filtering means that results in an efficient absorption of the contaminants (such as hydrogen sulfide) by the scavenger 22, 24 without creating a large amount of back pressure compared to that in conventional absorption towers or columns (where gas is typically allowed to bubble through a volume of liquid scavenger).

Preferably, the gas scrubbing system 10 further comprises one or more valved drains 50, 52 to allow an operator to drain away any contaminants 41c from the inlet separator 40 and/or liquid scavenger 24 from the system 10. In this embodiment, drain 50 is associated with the inlet separator 40 to facilitate draining of any contaminants 41c and drain 52 is associated with the scavenger 24 reservoir to facilitate draining of said scavenger 24. Even more preferably, the scrubber system 10 further comprises a burst plate 60 associated with the inlet 12i, so as to protect the vessel 12 and/or any vacuum pump (not shown) that may be hooked up to the system 10 from damage due to excess pressures. Preferably the burst plate 60 is set to burst at 5 psi.

Those of ordinary skill in the art will appreciate that various modifications to the invention as described herein will be possible without falling outside the scope of the invention.

The embodiments of the invention in which an exclusive property or privilege is being claimed are defined as follows:

1. A gas scrubbing system for removing hydrogen sulfide and liquid and solid contaminants from a flow of fluid, comprising:
   a container having an interior volume, an inlet for receiving the flow of fluid and an outlet for dispensing the flow of fluid;
   a hydrogen sulfide scavenger liquid;
   a porous medium positioned in the interior volume, between the inlet and outlet, for providing a high surface area to facilitate chemical interactions between the fluid flow and the hydrogen sulfide scavenger liquid;
   means to apply the hydrogen sulfide scavenger liquid onto the porous medium;
   a first cyclone separator associated with the inlet and positioned upstream, along the flow of fluid, of any of the porous medium;
   a second cyclone separator associated with the outlet,
   a catch reservoir to receive said liquid and solid contaminants,
   wherein the first cyclone separator facilitates the removal of any liquid and solid contaminants from the flow of fluid prior to contact with any of the porous medium and directs said contaminants into the catch reservoir.

2. The gas scrubbing system of claim 1 wherein the porous medium is a removable contact cell and further comprises a layer of poly-propylene beads, said beads being fully contained within said contact cell.

3. The gas scrubbing system of claim 2 wherein the diameter of the poly-propylene beads is in the range of $1/16^{th}$ to $1/4^{th}$ of an inch.

4. The gas scrubbing system of claim 2 wherein the contact cell further comprises two layers of reticulated foam positioned above and below the layer of poly-propylene beads.

5. The gas scrubbing system of claim 2 wherein the contact cell further comprises two layers of demister pad material positioned above and below the layer of poly-propylene beads.

6. The gas scrubbing system of claim 1
   wherein the second cyclone separator facilitates separation of any hydrogen sulfide scavenger liquid from the fluid flow, prior to said fluid flow exiting through the outlet.

7. The gas scrubbing system of claim 1 wherein the container is a pressure vessel capable of tolerating gas pressures of 1.5 pounds per square inch or higher.

8. The gas scrubbing system of claim 1 wherein the container is a pressure vessel capable of tolerating gas pressures of 5 pounds per square inch and further comprises a burst plate set to burst at 5 pounds per square inch.

9. The gas scrubbing system of claim 1 wherein the porous medium is comprised of a $1/8$th inch diameter poly-propylene beads and has at least a cross sectional area of 968 square inches and at least a volume of 5808 cubic inches.

* * * * *